US006925573B2

United States Patent
Bodas

(12) United States Patent
(10) Patent No.: US 6,925,573 B2
(45) Date of Patent: Aug. 2, 2005

(54) METHOD AND APPARATUS TO MANAGE USE OF SYSTEM POWER WITHIN A GIVEN SPECIFICATION

(75) Inventor: Devadatta V. Bodas, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 10/037,391

(22) Filed: Jan. 2, 2002

(65) Prior Publication Data
US 2003/0126475 A1 Jul. 3, 2003

(51) Int. Cl.7 .................................................. G06F 1/32
(52) U.S. Cl. ....................................... 713/320; 713/340
(58) Field of Search ................................. 713/300, 320, 713/322, 323, 324, 330, 340

(56) References Cited

U.S. PATENT DOCUMENTS

| | | | | |
|---|---|---|---|---|
| 5,339,445 A | * | 8/1994 | Gasztonyi | 713/324 |
| 5,560,022 A | * | 9/1996 | Dunstan et al. | 713/300 |
| 6,223,056 B1 | * | 4/2001 | Appel | 455/561 |
| 6,489,793 B2 | * | 12/2002 | Jones et al. | 324/760 |
| 2003/0020333 A1 | * | 1/2003 | Ying | 307/38 |
| 2003/0084359 A1 | * | 5/2003 | Bresniker et al. | 713/324 |
| 2003/0200473 A1 | * | 10/2003 | Fung | 713/320 |

OTHER PUBLICATIONS

Daniel Bovet and Marco Cesati, "Reducing Power Consumption on Your Linux Box," www.linux.oreilly.com, Nov. 29, 2000, O'Reilly & Associates, Sebastopol, CA, USA.

* cited by examiner

Primary Examiner—Dennis M. Butler
(74) Attorney, Agent, or Firm—Blakely, Sokoloff, Taylor & Zafman LLP

(57) ABSTRACT

Power consumption in a system is monitored by a controller. The controller uses a power consumption policy to determine when the power consumption of the system needs to be adjusted. Adjustment is made by gradually reducing power consumptions of one or more components in the system or allowing the one or more components to gradually increase the power consumption.

17 Claims, 6 Drawing Sheets

METHOD AND APPARATUS TO MANAGE USE OF SYSTEM POWER WITHIN A GIVEN SPECIFICATION

FIELD OF THE INVENTION

The present invention relates generally to field of power management. More specifically, the present invention relates to methods and apparatuses for managing power consumption.

BACKGROUND

In many computer systems, system power specification is based upon analytical models. Such analytical models make certain assumptions on distribution of power usage by various components of the system. The system power specification is sum of maximum estimated power consumption of all the components. A system power supply is designed to support this system power specification.

Typically, there is no protection against power supply or system failure due to over demand of power by the components in the system. For many computer systems, it is impossible to measure power usage in all the possible scenarios. In addition, many new usage models, applications and data patterns are discovered on regular basis. When a new usage model makes the system components demand more power than what the power supply can provide, the power supply and accordingly the system fail. To reduce probability of failure due to component power specifications, voltage regulators (VR), power rails and power supply are designed with hefty guard banding (e.g., over designed). For example, a system power supply may have a maximum rating that is a percentage (e.g., 20 percent) higher than the system power specification.

When the power supply solutions are over designed, there are two major problems. First, the inflated system power specification drives higher demand on associated infrastructures. These problems are more evident in data centers. For example, in data centers, systems are installed on racks. The racks have limited power and cooling capability. Many times data center administrators use system power specification (based on name plate specification) to determine the number of systems that can go on a rack. With system power specification growing every generation, the number of systems that can be supported by the rack decreases. As a result, there are more and more empty spaces on the rack. Second, an over design results in larger and more expensive power supply and voltage regulators.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

Methods and apparatuses for power consumption management are disclosed. Power consumption in a system varies at different levels depending on power consumption of components in the system at any particular time. A power consumption policy for the system is established to manage the power consumption of the system based on the different levels of power consumption. When the power consumption policy is violated, adjustment of the power consumption of one or more components in the system is performed.

Methods and apparatuses for managing power consumption are described herein. In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Figure 1:
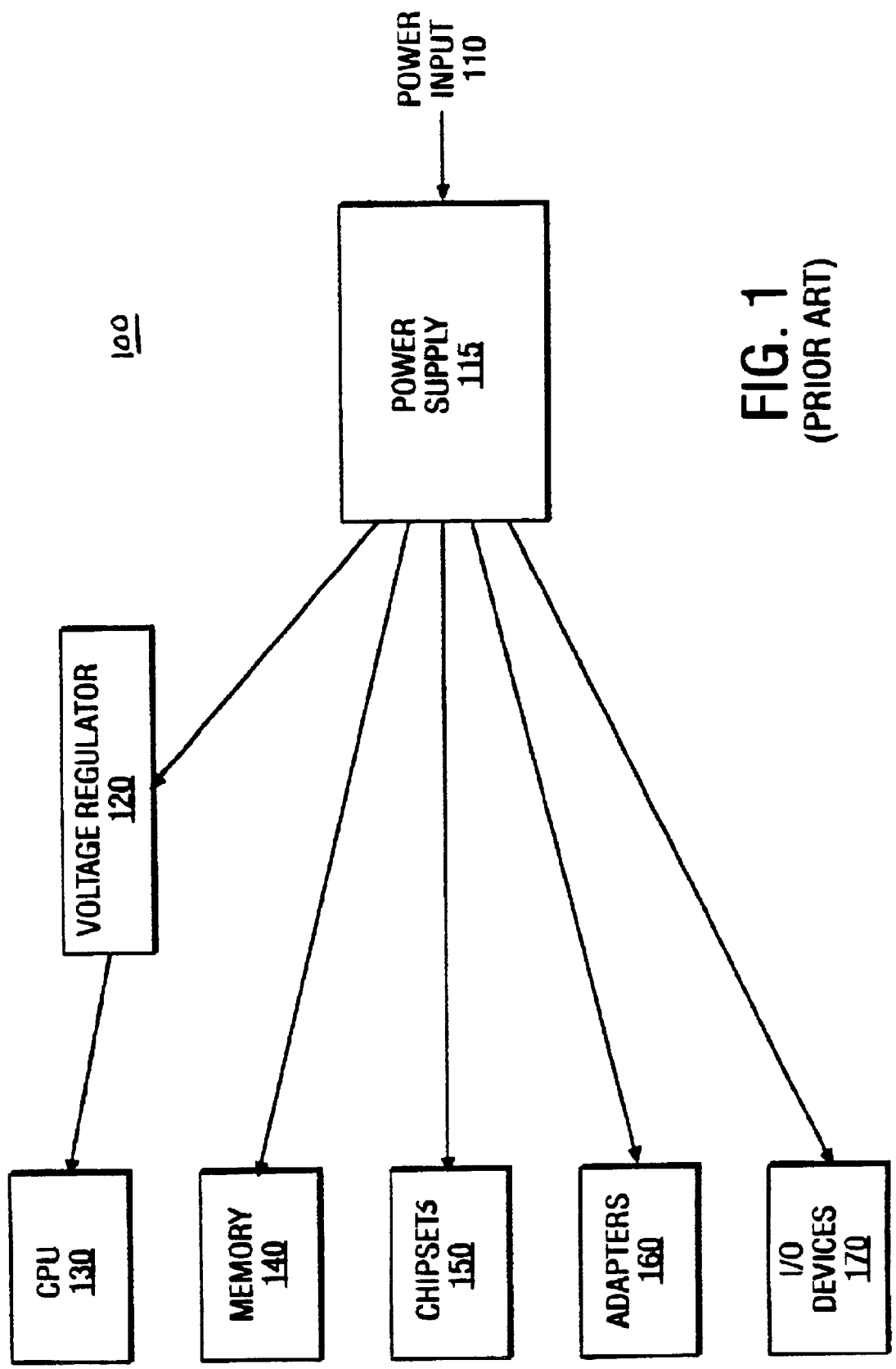
FIG. 1 is a block diagram illustrating a prior art power distribution system.

FIG. 1 is a block diagram illustrating a prior art power distribution system. The system 100 includes a power supply 115, which receives power input 110. The power input 110 may be a DC power source (e.g., power from a battery) or an AC power source (e.g., power from a wall outlet). The power supply 115 may distribute power to multiple components such as, for example, processor 130, memory banks 140, chip sets 150, adapters 160, I/O devices 170, etc. As described earlier, selection of the power supply 115 is dependent on power budget of the components anticipated to be configured in the system 100. When a total power requirement of the system 100 exceeds a rating of the power supply 115, the power supply 115 may shut down by way of a protection circuitry (e.g., a circuit breaker).

The power budget of each component may be predicted by the component designer based on how the component will be used. For example, the power budget for the processor 130 may be predicted based the types of applications the processor 130 will process. The power budget prediction may then be multiplied by a margin factor to compensate for any under-prediction. The power from the power supply 115 may first be distributed to a voltage regulator 120 prior to being distributed to a component (e.g., processor 130). In this situation, the voltage regulator 120 may itself have a power budget that is predicted based on some efficiency level of the voltage regulator 120 and a margin factor. This predicted power budget of the voltage regulator 120 is then drawn from the power supply 115.

In addition, there may be margin factors added to compensate for any process variation because the components in a system may be manufactured by different vendors. Using these compensated power budgets of the various components in the system 100, a total power requirement for the system 100 is estimated. To compensate for under-estimation of the total power requirement, another margin factor may be added to determine a power rating of the power supply 115. Thus, there may be multiple levels of power compensation by the various components in the system 100. This may unnecessarily magnify the power requirement of the system 100 resulting in a larger and more expensive power supply 115.

Figure 2:
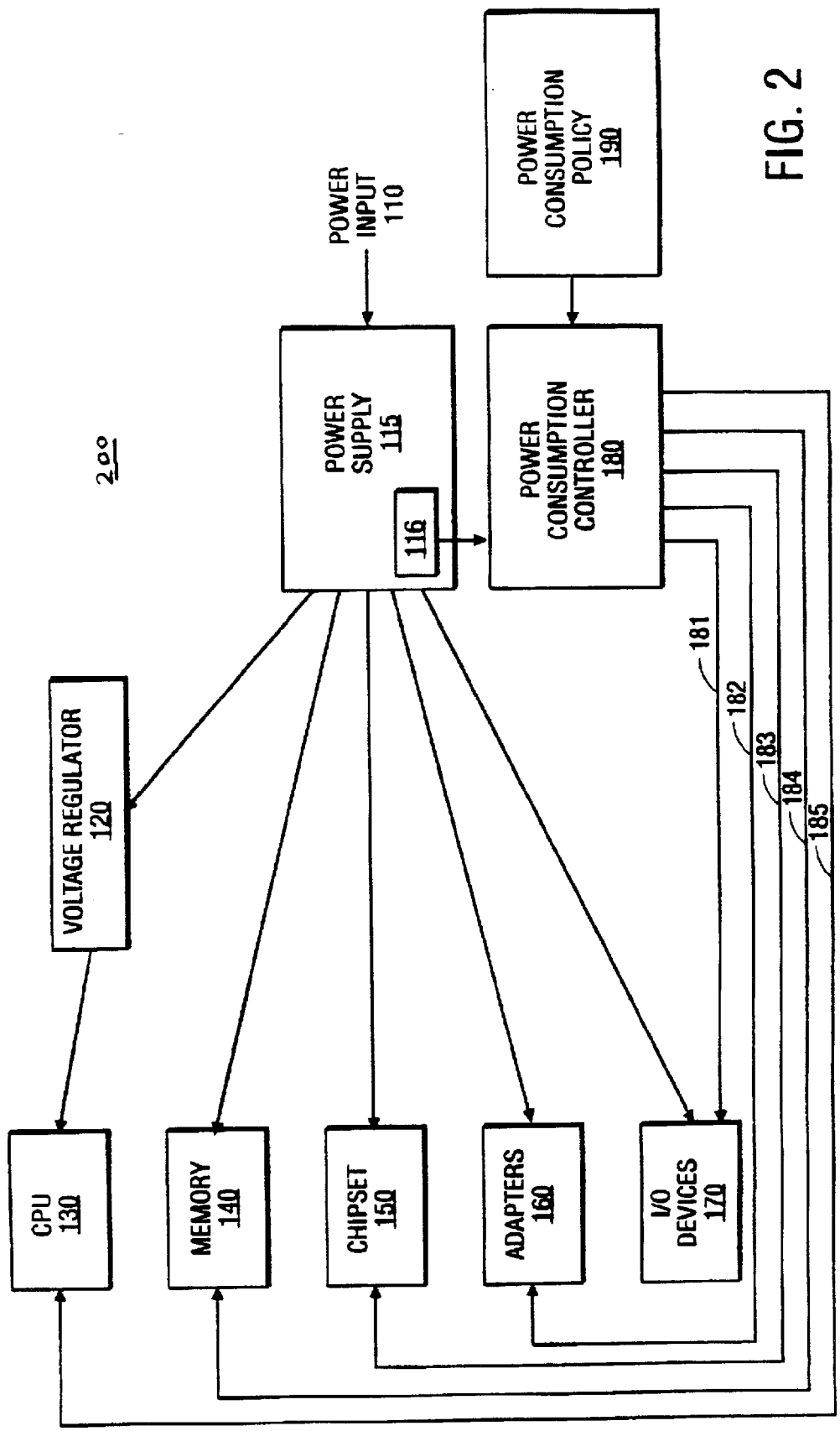
FIG. 2 is a block diagram illustrating a power distribution system with power consumption monitoring capability based on information provided by a power supply.

FIG. 2 is a block diagram illustrating a power distribution system with power consumption monitoring capability based on information provided by a power supply. The system 200 includes a power consumption controller 180.

The power consumption controller 180 is responsible for monitoring and managing the power consumption of the system 200 based on a power consumption policy 190. The power consumption policy 190 allows the power consumption controller 180 to take appropriate evasive action at appropriate times. The power consumption controller 180 may use information provided by the power consumption policy 190 to determine a level of power consumption of the system 200 that may cause the system 200 to fail.

In one embodiment, the power consumption controller 180 monitors the power consumption by receiving information about a current level of power consumption of the system 200 from the power supply 115. For example, the power supply 115 may provide a port 116 to extract the current level of power consumption information. The power consumption controller 180 manages the power consumption of the system by managing the power consumption of one or more components in the system 200. For example, when the level of power consumption of the system 200 is too high, the power consumption controller 180 may use the connections 181–185 to direct one or more of the components 130–170 to reduce their power consumption, if applicable.

Figure 3:
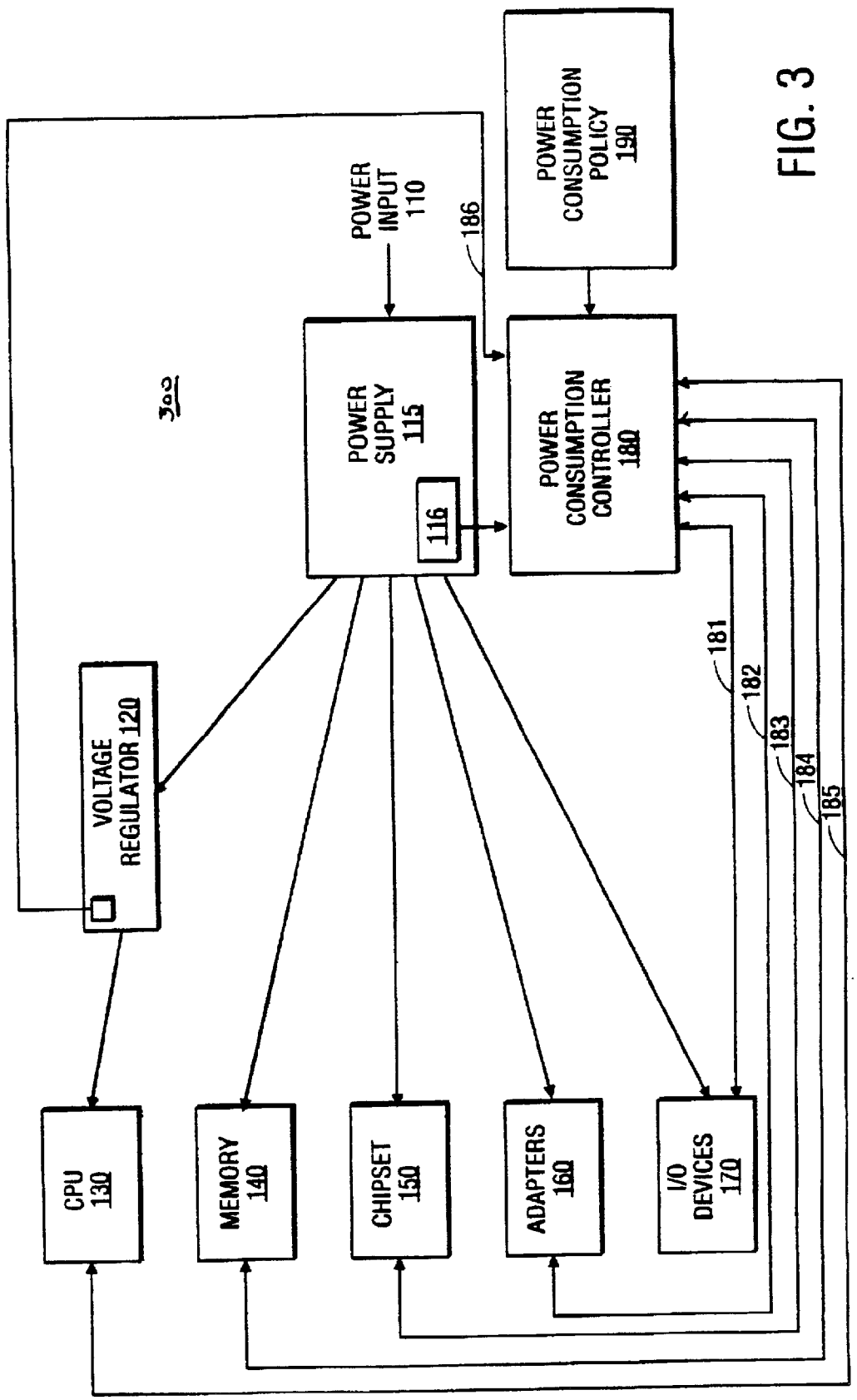
FIG. 3 is a block diagram illustrating a power distribution system with power consumption monitoring capability based on information provided by components in the system.

FIG. 3 is a block diagram illustrating a power distribution system with power consumption monitoring capability based on information provided by components in the system. The system 300 illustrates the power consumption controller 180 receiving power consumption information from each of the components 130–170 using the connections 181–185. The system 300 may also receive power consumption information from the voltage regulator 120 using connection 186.

The power consumption controller 180 is capable of modifying configurations of one or more components in the system 300 such that the power consumption of these components is reduced. There may be different ways to reduce the power consumption of the components. For example, the power consumption of the processor 130 may be reduced by changing its speed from a high frequency high power speed mode of 1 GHz to a lower frequency protected mode of 700 MHz. As another example, the power consumption of the memory 140 may be reduced by reducing the memory throughput, etc. One advantage of this reduction of power consumption technique over the prior arts is the flexibility of not having to power off one or more components in the system. For example, the power consumption of the processor may be gradually reduced be setting it to different speed modes.

The power controller 180 needs to be aware of the components in the system and how these components can be configured to reduce power consumption, or how they are allowed to increase power consumption. Because there may be situations where not all of the components in the system can be configured to adjust their power consumption, the power consumption controller 180 may need to know the power consumption configuration information for some of the components. The component information and the corresponding power consumption configuration information may be provided by the power consumption policy 190. Other methods may also be used to provide the configuration information. In one embodiment, the power consumption controller 180 can adjust the power consumption of the components that do not cause the system to fail.

Figure 4:
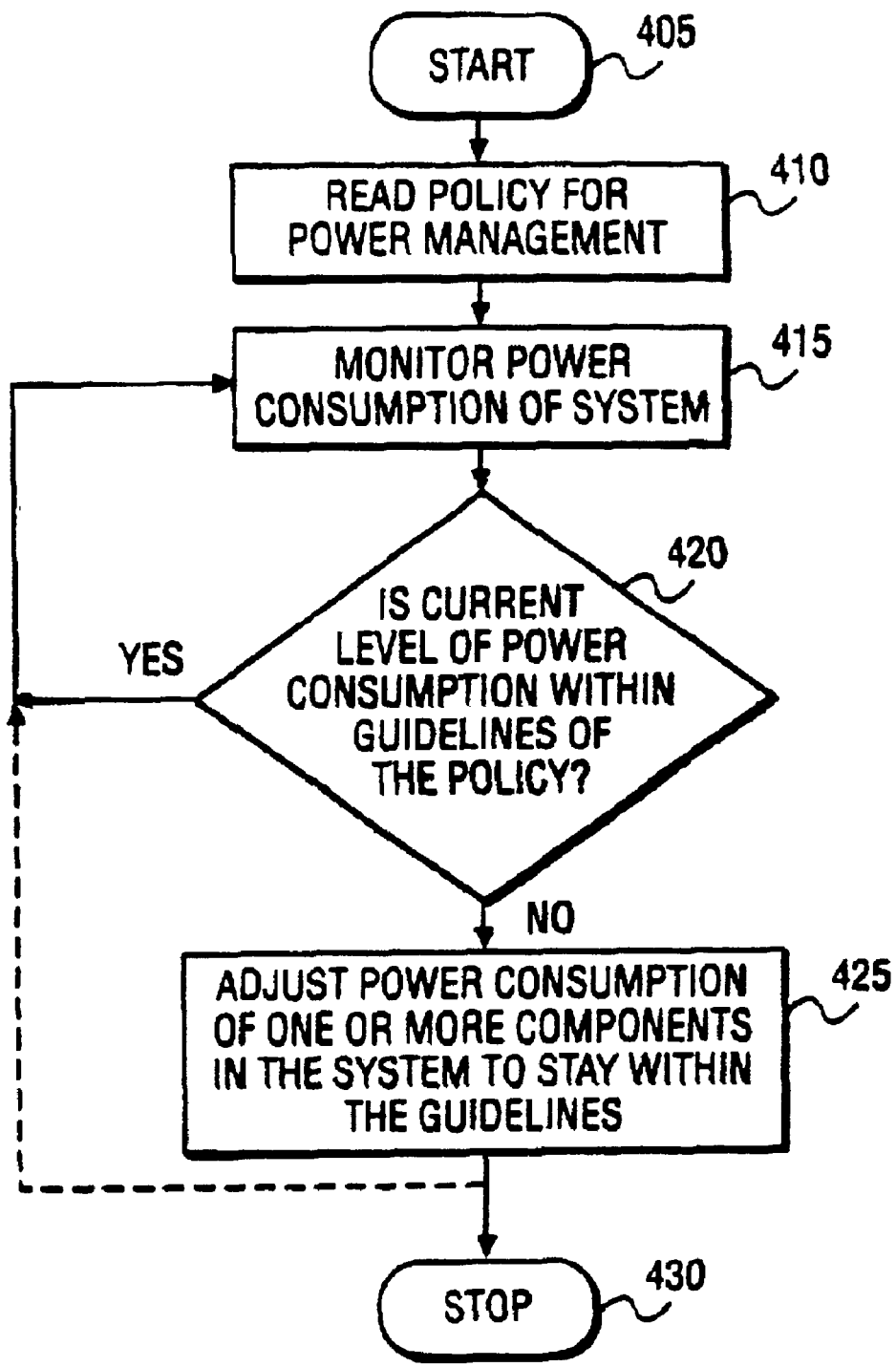
FIG. 4 is a flow diagram illustrating one embodiment of a power consumption monitoring process.

FIG. 4 is a flow diagram illustrating one embodiment of a power consumption monitoring process. The process is performed by a power consumption controller and starts at block 405. At block 410, the power consumption controller reads the power consumption policy for information to manage the power consumption of a system. At block 415, the power consumption controller starts monitoring the power consumption of the system. At block 420, a test is made to determine if a current level of power consumption by the system is within guidelines of the power consumption policy. The guidelines may specify a range of acceptable level of power consumption. When the current level is within the guidelines, the process flows to block 415. When the current level is violates the guidelines, the process flows to block 425 where the power consumption of one or more components is adjusted to bring the level of power consumption back to within the guidelines. The process may stop at block 430 after one pass, or the process may flow from block 425 to block 415 for continuous monitoring of the power consumption of the system.

In another embodiment, the process may flow from block 425 back to block 410. This would accommodate dynamic change to the power consumption policy and thus enable dynamic power management by the power consumption controller.

Figure 5:
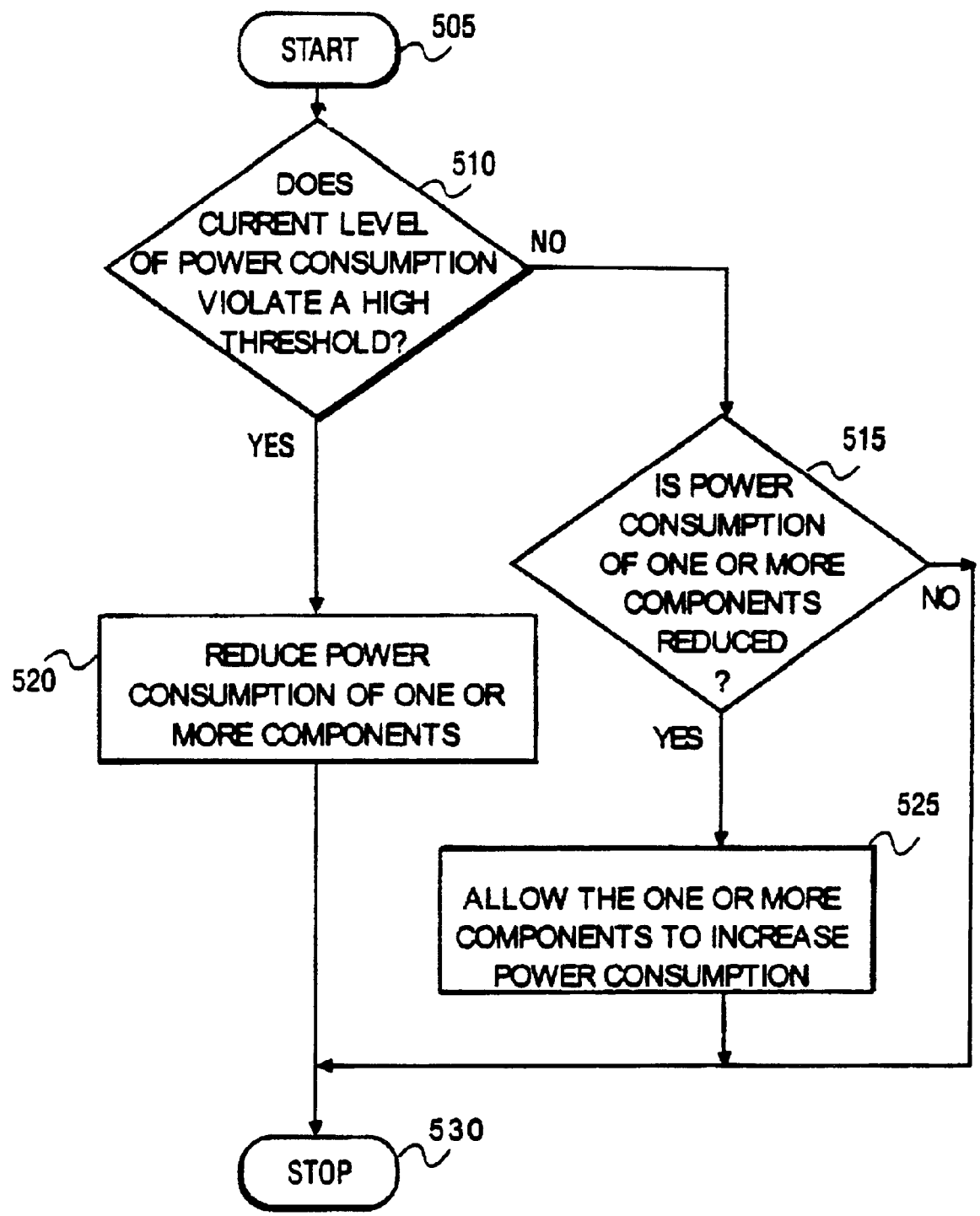
FIG. 5 is a flow diagram illustrating one embodiment of a power consumption adjustment process.

FIG. 5 is a flow diagram illustrating one embodiment of a power consumption adjustment process. In one embodiment, the guidelines of the power consumption policy include a high acceptable power consumption threshold level and a low acceptable power consumption threshold level. When a current level of power consumption is determined to be outside a range between the low threshold and the high threshold, violation of the guidelines occurs.

The power consumption adjustment process starts at block 505. The process describes the operation performed in block 425 of FIG. 4. At block 510, a test is made to determine if the current level of power consumption violates the high threshold. When the high threshold is violated, the process flows from block 510 to block 520 where the power consumption of one or more components is reduced. There may be some delay to give time for the one or more components to change their power consumption. In this case, the power consumption controller may wait before taking a next measurement of the level of power consumption of the system.

From block 510, when the current level of power consumption does not violate the high threshold, this means the low threshold is violated (as described in block 425 of FIG. 4). The process flows to block 515 where a test is made to determine if the power consumption of one or more components was previously reduced based on the power consumption policy. When there was no previous reduction of power consumption of any components in the system, the process flows from block 515 to block 530. This indicates that the system experiences low power consumption by design and not by having the power consumption controller reducing the power consumption of one or more components in the system. However, from block 515, when there was a previous reduction of power consumption of one or more components by the power consumption controller, the process flows to block 525 where the power consumption of these components are allowed to increase. The process stops at block 530.

Figure 6:
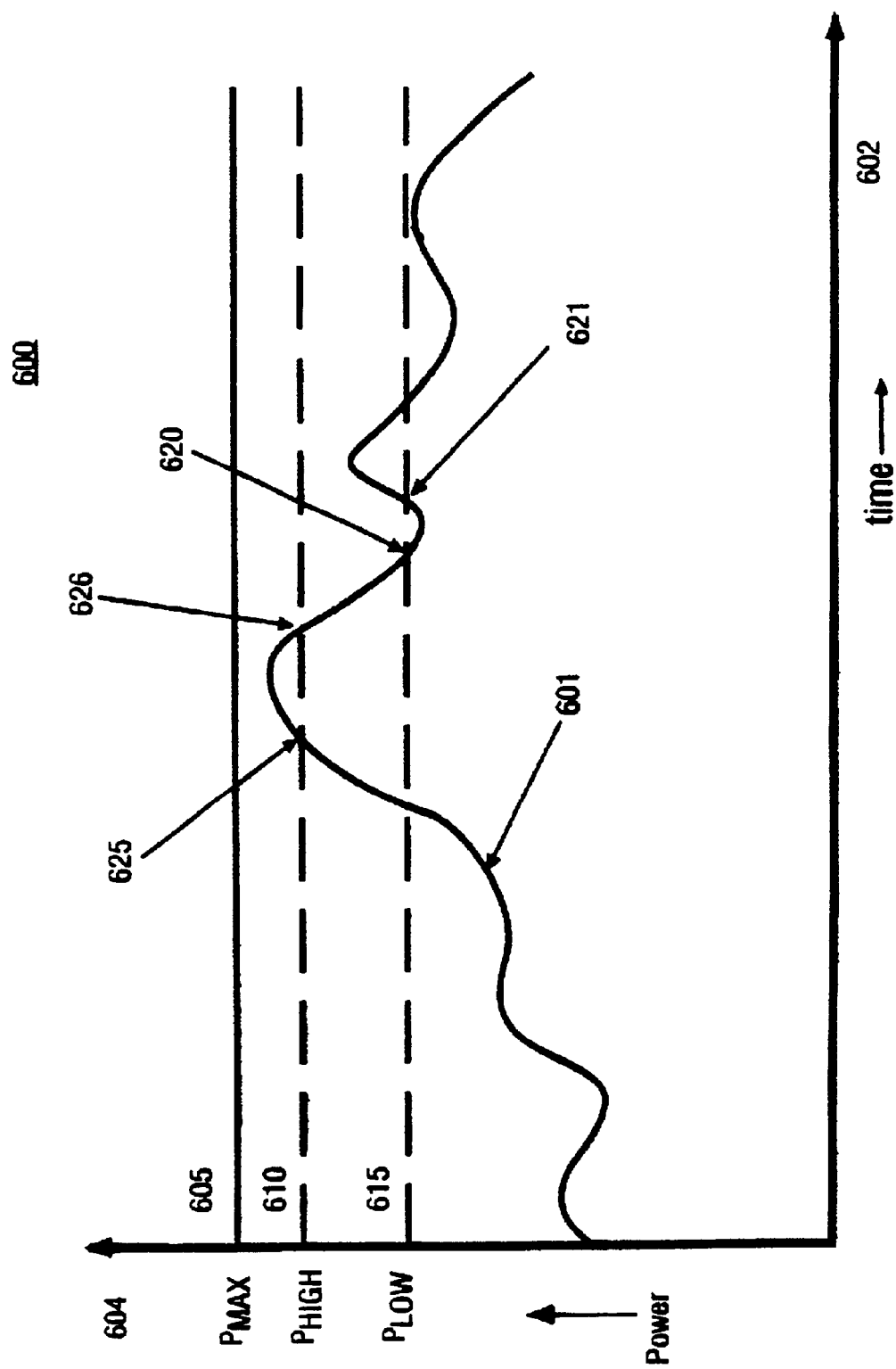
FIG. 6 is a graph illustrating level of power consumption in a system over time.

FIG. 6 is a graph illustrating level of power consumption in a system over time. The graph 600 includes a vertical axis 604 representing levels of power consumption in a system, and a horizontal axis 602 representing time. The curve 601 illustrates different levels of power consumption of the system over a period of time. The level P_HIGH 610 represents a high power consumption threshold defined by the power consumption policy. Similarly, the level P_LOW 615 represents a low power consumption threshold defined by the power consumption policy. The level P_MAX 605 represents a maximum level of power consumption supported by the power supply. For example, the level P_MAX 605 may be a power rating specified by the manufacturer of the power supply. When the power consumption level exceeds the level P_MAX 605 for a sustained period of time, the power supply may shut down.

The level P_MAX 605, the level P_HIGH 610, and the level P_LOW 615 may be provided by a power consumption policy that is used by a power consumption controller to manage and to prevent the power consumption of the system from exceeding the level P_MAX 605 for a sustained period of time. The range between the level P_LOW 615 and the level P_HIGH 610 is considered an acceptable power consumption range. When the boundaries (high and low) of this range are exceeded, the power consumption of one or more components in the system may need to be adjusted.

When the curve 601 reaches the level P_HIGH 610 at point 625, the power consumption of one or more components in the system is reduced. There may be a delay from when the curve 601 reaches the point 625 until the reduction of power consumption begins to reflect on the overall power consumption level of the system. This delay may cause the power consumption of the system to exceed the level P_HIGH 610 for a short period of time, as illustrated between the points 625 and 626. Different methods may be used to determine the level P_HIGH 610. For example, the level P_HIGH 610 may be determined by having the system execute one or more sets of applications and then determining the level of power consumption. The one or more sets of applications may include, for example, applications that are typical for a certain industry segment. This process of determining the levels of power consumption is referred to as power profiling.

Generally, when the power consumption level of the system is below the level P_LOW 615, no power consumption adjustment is necessary if there was no previous reduction of power consumption of any of the components in the system. However, when the current level of power consumption of the system is below the level P_LOW 615, and there has been reduction of power consumption of one or more components in the system, the power consumption of these components are allowed to increase. For example, at point 620 on the curve 601, the power consumption of the system reaches the level P_LOW 615, and the power consumptions of one or more components are allowed to increase. There may be a delay from when the curve 601 reaches the point 620 until the increase of power consumption begins to reflect on the overall power consumption level of the system. This delay may cause the power consumption of the system to fall below the P_LOW level 615 for a short period of time, as illustrated between the points 620 and 621.

The operations of the various methods of the present invention may be implemented by a processing unit in a digital processing system, which executes sequences of computer program instructions. The power consumption controller may be implemented in software, in hardware or in a combination of both software and hardware. For example, the power consumption controller may be implemented as a chip or chip set with hardware circuitry that includes an auxiliary processor dedicated to performing functions of power management. The chip or chip set may further include internal memory, and bus connections to the components (e.g., system CPU, system memory, etc.) in the system. The chip or chip set may also include bus connection(s) to receive power consumption information.

As another example, the power consumption controller may be an application software including instructions that are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the CPU (e.g., system processor).

In other cases, the instructions may not be performed directly or they may not be directly executable by the CPU. Under these circumstances, the executions may be executed by causing the CPU to execute an interpreter that interprets the instructions, or by causing the CPU to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   monitoring a level of power consumption of a system; and
   when the monitored level of power consumption of the system violates a power consumption policy, adjusting power consumption of one or more components in the system until the level of power consumption of the system does not violate the power consumption policy, wherein the power consumption policy includes a high threshold and a low threshold, and wherein the power consumption policy is violated when the monitored level of power consumption is beyond a range between the high threshold and the low threshold, wherein adjusting the power consumption of the one or more components in the system includes:
   determining if the monitored level of power consumption violates a high threshold;
   when the monitored level of power consumption violates the high threshold, reducing the power consumption of the one or more components in the system without having to power off the one or more components;
   when the monitored level of power consumption does not violate the high threshold, determining if the power consumption of the one or more components in the system has been previously reduced; and
   when the power consumption of the one or more components in the system has been previously reduced, allowing the power consumption of the one or more components to increase.

2. The method of claim 1, wherein the power consumption policy includes information about the one or more components in the system.

3. The method of claim 2, wherein the information about the one or more components in the system includes information about how to adjust the power consumption of the one or more components.

4. The method of claim 1, wherein monitoring the level of power consumption of the system comprises accessing information about a current level of power consumption from a power supply providing power to the system.

5. The method of claim 1, wherein monitoring the level of power consumption of the system comprises accessing information about a current level of power consumption from each of the components in the system.

6. The method of claim 1, wherein the one or more components in the system include components that contribute to the power consumption of the system.

7. A computer readable medium having stored thereon sequences of instructions which are executable by a system, and which, when executed by the system, cause the system to perform a method, comprising: monitoring level of power consumption of a system; and when the monitored level of power consumption of the system violates a power consumption policy, adjusting power consumption of one or more components in the system until the level of power consumption of the system does not violate the power consumption policy, wherein the power consumption policy includes a high threshold and a low threshold, and wherein the power consumption policy is violated when the monitored level of power consumption is beyond a range between the high threshold and the low threshold, wherein adjusting the power consumption of the one or more components in the system includes;

determining if the monitored level of power consumption violates a high threshold;

when the monitored level of power consumption violates the high threshold, reducing the power consumption of the one or more components in the system without having to power off the one or more components;

when the monitors a power consumption does not violate the high threshold, determining if the power consumption of the one or more components in the system has been previously reduced; and when the power consumption of the one or more components in the system has been previously reduced, allowing the power consumption of the one or more components to increase.

8. The computer readable medium of claim 7, wherein the power consumption policy includes information about the one or more components in the system.

9. The computer readable medium of claim 8, wherein the information about the one or more components in the system includes information about how to adjust power consumption of the one or more components.

10. The computer readable medium of claim 7, wherein monitoring the level of power consumption of the system comprises accessing information about a current level of power consumption from a power supply providing power to the system.

11. The computer readable medium of claim 7, wherein monitoring the level of power consumption of the system comprises accessing information about a current level of power consumption from each of the components in the system.

12. A power consumption controller apparatus, comprising:

logic to monitor a level of power consumption in a system; and logic to adjust power consumption of one or more components in the system when the monitored level of power consumption in the system violates a power consumption policy, wherein the power consumption policy includes a high threshold and a low threshold, and wherein the power consumption policy is violated when the monitored level of power consumption is beyond a range between the high threshold and the low threshold, the logic to adjust the power consumption of the one or more components comprising:

logic to determine if the monitored level of power consumption in the system violates the high threshold;

when the monitored level of power consumption in the system violates the high threshold, logic to reduce the power consumption of the one or more components;

when the monitored level of power consumption does not violate the high threshold, logic to determine if the power consumption of the one or more components has been reduced; and when the power consumption of the one or more components has been reduced, logic to allow the power consumption of the one or more components to increase, wherein the power consumption of the one or more components in the system is gradually decreased or increased until the system stops violating the power consumption policy.

13. The apparatus of claim 12, wherein the power consumption policy includes information about the one or more components in the system.

14. The apparatus of claim 13, wherein the information about the one or more components in the system includes information about how to gradually adjust the power consumption of the one or more components.

15. The apparatus of claim 12, wherein the logic to monitor the level of power consumption of the system comprises logic to receive the level of power consumption from a power supply providing power to the system.

16. The apparatus of claim 12, wherein the logic to monitor the level of power consumption of the system comprises logic to receive a current level of power consumption from each of the one or more components in the system.

17. A power consumption controller apparatus, comprising:

means for monitoring a level of power consumption in a system; and means for adjusting power consumption of one or more components in the system when the monitored level of power consumption in the system violates a power consumption policy, wherein the means for adjusting comprises means for determining if the monitored level of power consumption is beyond a range of acceptable power consumption levels provided by the power consumption policy, wherein the range of acceptable power consumption levels includes a high power consumption threshold and a low power consumption threshold, wherein the power consumption of the one or more components in the system is gradually reduced when violating the high threshold or increased when violating the low threshold until the system stops violating the power consumption policy.

* * * * *

UNITED STATES PATENT AND TRADEMARK OFFICE
CERTIFICATE OF CORRECTION

PATENT NO. : 6,925,573 B2
DATED : August 2, 2005
INVENTOR(S) : Bodas

It is certified that error appears in the above-identified patent and that said Letters Patent is hereby corrected as shown below:

Column 7,
Line 32, delete "monitors a" and insert -- monitored level --.

Signed and Sealed this

Sixth Day of December, 2005

JON W. DUDAS
*Director of the United States Patent and Trademark Office*